(No Model.)

H. M. PAINE.
ELECTRIC MOTOR.

No. 343,487 — Patented June 8, 1886.

2 Sheets—Sheet 1.

Witnesses
Edwin M. Wight
Benj. S. Morehouse

Inventor
Henry M. Paine (No Model.) 2 Sheets—Sheet 2.

H. M. PAINE.
ELECTRIC MOTOR.

No. 343,487. Patented June 8, 1886.

Witnesses.
Geo. W. Rea.
Robt. Errett.

Inventor:
Henry M. Paine
by A. M. Tanner
Atty.

UNITED STATES PATENT OFFICE.

HENRY M. PAINE, OF NEWARK, NEW JERSEY.

ELECTRIC MOTOR.

SPECIFICATION forming part of Letters Patent No. 343,487, dated June 8, 1886.

Application filed December 19, 1885. Serial No. 186,149. (No model.) Patented in England June 3, 1875, No. 2,049, and in France December 1, 1875, No. 110,552.

*To all whom it may concern:*

Be it known that I, HENRY M. PAINE, a citizen of the United States, residing at Newark, in the county of Essex and State of New Jersey, have invented certain new and useful Improvements in Electric Motors, of which the following is a specification, reference being had to the accompanying drawings, forming part of this specification.

My invention relates to a novel construction and arrangement of the magnets and armatures in an electro-magnetic motor, whereby any given magnetic force in the magnets is rendered available for motive power to a much greater extent than by any form and arrangement of the magnets hitherto employed.

The invention consists in the construction and arrangement of magnets and armatures, which will be hereinafter more fully described, and then set forth in the claims.

Figure 1:
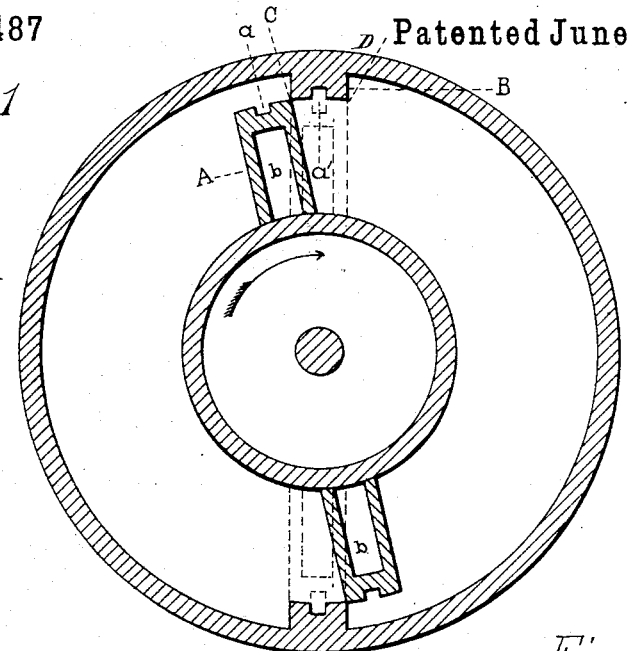
Figure 2:
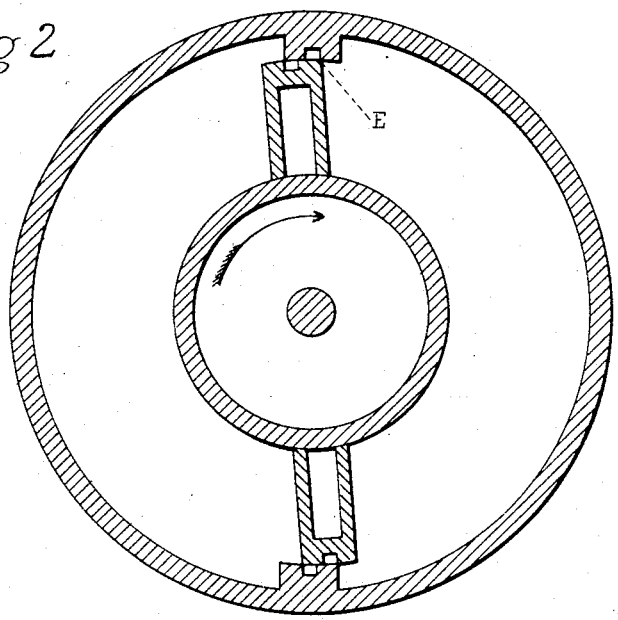
Figure 3:
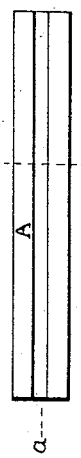
Figure 4:
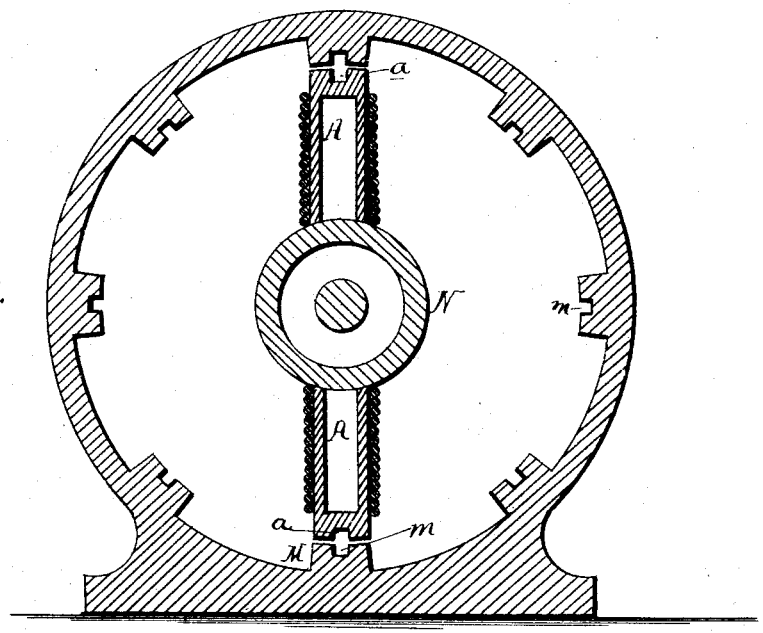
Figure 5:
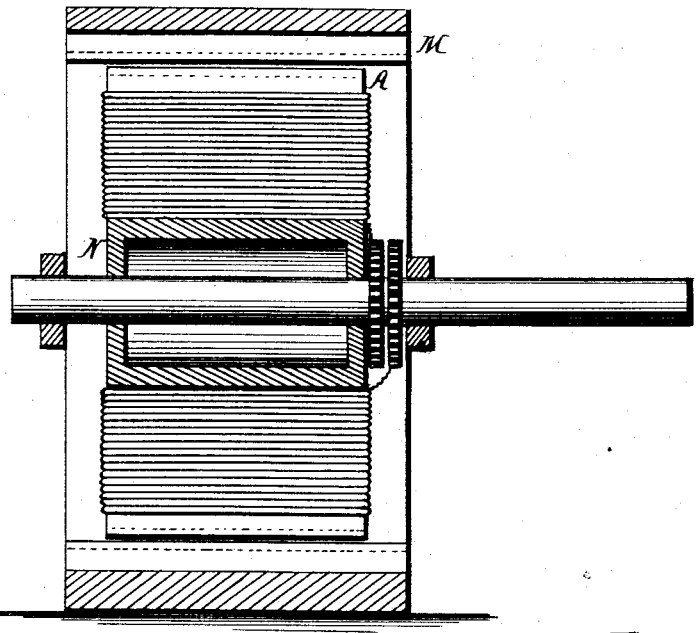

In the drawings, Figure 1 is a vertical section representing the position of the electro-magnets (shown uncovered) when the edges thereof touch the edges of the armatures. Fig. 2 is a similar view showing the magnets (also represented naked) and armatures coincident with each other. Fig. 3 is a face view of the pole portion of the magnet. Fig. 4 is a vertical transverse section of an electric motor embodying my improvements. Fig. 5 is a vertical longitudinal section showing the arrangement of my magnets, armatures, and other well-known parts of an electric motor.

It is well known that when a magnet approaches its armature the maximum of its force is developed at the moment of contact, and when the magnet and armature are thus arranged the one passes through the field of the other, and the minimum is exerted when their respective neutral axes are coincident.

Referring to Fig. 1, and assuming the polar faces of the magnet and armature to be solid sections and without the grooves hereinafter referred to, the maximum would be attained at C and the minimum at D, and the efficiency the mean of the result. I have ascertained that by providing the pole-face of the magnet A with a groove extending longitudinally in said face, as is clearly seen at $a$ in Fig. 3, and providing the armature M with a corresponding groove, $m$, in the face over which the pole-face of the magnet sweeps, that when the magnet-pole has reached the position shown at E in Fig. 2 a secondary engagement of the direct magnetic attraction ensues equal to one-third of that of the first engagement, C, Fig. 1, and the efficiency will be the mean of the first and second engagements. It is obvious that when the armature and magnet are both provided with a groove, as is herein represented, a double result is obtained over the grooving of only one of them, inasmuch as the attractive angles are increased.

It may be stated that the grooves $a$ and $m$ should not exceed one-fifth of the polar face in width, and should not be less than one-eighth of such face in depth.

In addition to providing the pole-face of the magnet with a longitudinal groove and forming a corresponding groove in the face of the armature, I propose to make the magnet hollow or to core it out from the grooved pole-face to the hub N, which bears the same. As is seen in the present instance, the limb of the magnet is of the rectangular shape customarily employed in that form of motors in which the magnet traverses the shortest axis of the magnetic field at right angles.

The object in making the limb of the magnet hollow and leaving it with a solid face has a dual purpose—first, the removal of a mass of matter that absorbs electric energy without any return of value and the lessening of inertia which in motors of practical size will equal one-third of the vis inertia of their moving parts.

In Figs. 4 and 5 I have shown the wire covered magnets and series of armatures of an electric motor, also other well known devices, whereby the electric current is caused to pass through the helices of several magnets in such order that they are successively charged, so as to cause a rotation of the shaft bearing the same. I would state that sometimes I produce good and satisfactory results by grooving only the armature in the direction of its length and leaving the magnet with a solid ungrooved pole-face, or else the magnet only need be grooved and the armature left with a solid face. Still, to obtain the best results possible, I prefer to make use of the construction and arrangement shown in the drawings In English and French patents granted to me through the procuration of others, or issued jointly to me and other parties, I have disclosed among other features an armature having a groove or grooves made parallel to the axis of the magnet for the purpose of increasing the efficacy of the latter, in the manner and for the purpose hereinbefore set forth. The English Patent bears date of June 3, 1875, No. 2,049, and is in the name of Nelson & Anderson, and the French Patent is dated December 1, 1875, No. 110,552, and is in the name of Paine & Nelson.

Having thus described my invention, what I claim as new, and desire to secure by Letters Patent, is—

1. In an electric motor, the combination of a magnet having a longitudinal groove in its pole-face with an armature arranged in co-operative relation to said magnet, substantially as herein set forth.

2. In an electric motor, the combination of an armature having a groove made parallel to its axis or extending longitudinally in its face with a magnet arranged in co-operative relation to said armature, substantially as herein set forth.

3. In an electric motor, the combination of a magnet having a longitudinal groove in its pole-face with an armature having a corresponding groove in the face over which the magnet moves, substantially as herein set forth.

4. In an electric motor, the combination of a hollow magnet having a solid pole-face grooved in a direction parallel to its axis with an armature co-operating with said hollow and grooved face magnet, substantially as herein set forth.

HENRY M. PAINE.

Witnesses:
EDWIN M. WIGHT,
BENJ. S. MOREHOUSE.